May 27, 1969
O. F. WHITE
3,446,428
MECHANISM FOR DISPELLING INSECTS AND PROTECTION
FROM SUN AND DUST
Filed May 12, 1967
Sheet 2 of 2
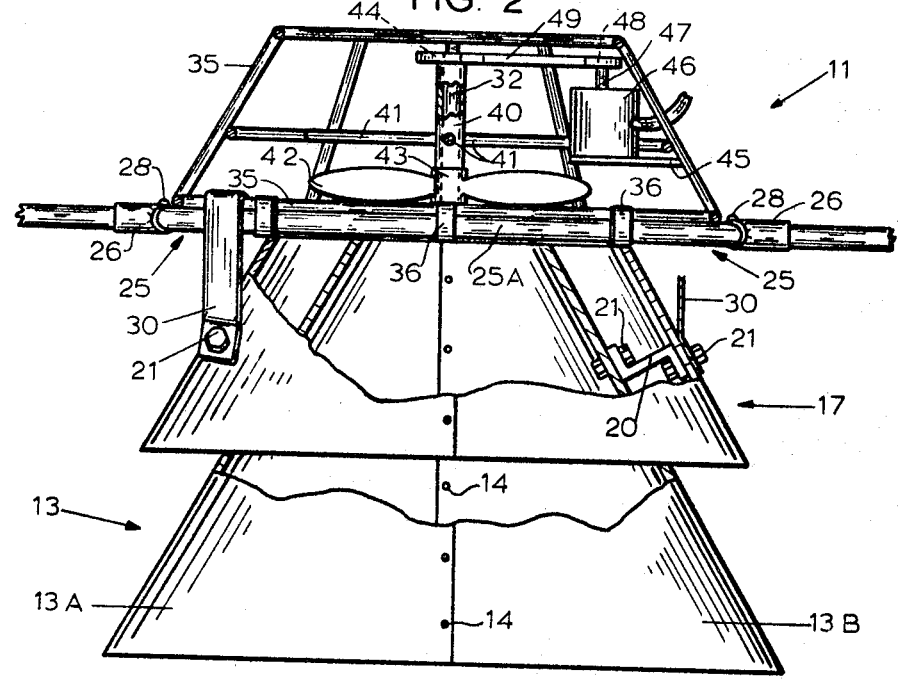
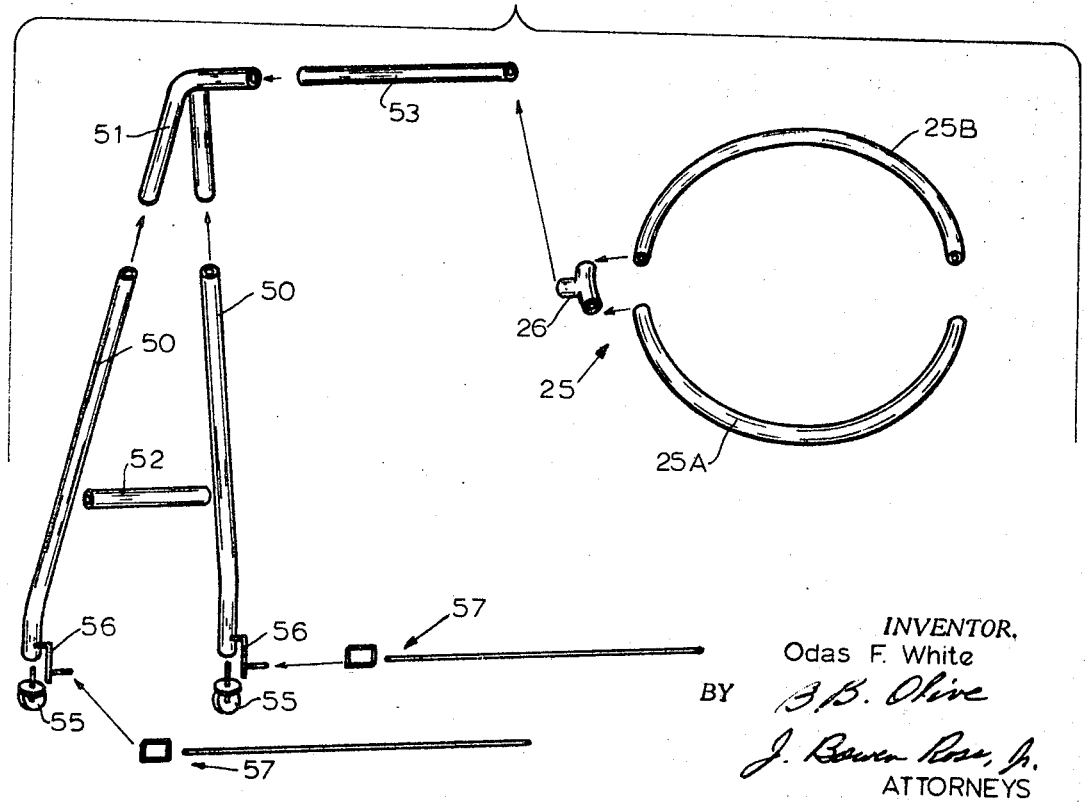
INVENTOR,
Odas F. White
BY
ATTORNEYS

United States Patent Office 3,446,428
Patented May 27, 1969

3,446,428
MECHANISM FOR DISPELLING INSECTS AND PROTECTION FROM SUN AND DUST
Odas F. White, Box 833, Hillsborough, N.C. 27278
Filed May 12, 1967, Ser. No. 637,959
Int. Cl. F04d *25/08;* F16m *11/00;* A01m *5/08*
U.S. Cl. 230—241
2 Claims

ABSTRACT OF THE DISCLOSURE

An overhead suspended and mobile insect repelling apparatus establishes a boundary layer of forced air around a given area, such as, a picnic area, a work bench, or a hammock and which prevents penetration of insects into the area but otherwise leaves the area unobstructed. A propeller and its driving motor are mounted above a pair of axially aligned air deflecting cones and the propeller-motor-cone structure is centrally suspended from a mobile frame which resides above and across the area but the area itself is left unobstructed by the frame and its suspended structure such that a conical wall of disturbed air or a buffered air zone is created around the area beneath the cones.

BACKGROUND OF THE INVENTION (1) *Field of the invention*

This invention relates to improvements in insect repellers of the forced air type and, more particularly, to means for mounting the device and the mobile positioning means. Devices of this type are sometimes classified under fans of the combined devices type in class 230, subclass 241.

(2) *Description of the prior art*

It is known that a stream of air of sufficient velocity cannot be penetrated by insects, such as flies, gnats, mosquitos or the like. Conventional electric fans have been employed, for example, in dairies where large numbers of flying insects are encountered. Insects and, more particularly, flying insects are bothersome around picnic or rest areas. Swatters, flypaper and the like have helped control insects but such means of control is unsanitary and bothersome to use. Aside from the insect problem, it is desirable when employing electric fans at picnics or around the area of a work bench to be protected from a direct blast of air, to have means for shading food and drinks, and to have a cool area in which to relax or work. Applicant's already issued Patents No. 3,258,200 and No. 3,306,532, found in class 230, subclass 241, have provided tremendous improvement over prior constructions. These patents are directed toward insect repellers of the type which are moved over the desired area to be protected.

SUMMARY OF THE INVENTION

In this invention, an insect repelling apparatus is provided with a mobile frame having support legs and ground-engaging wheels. Also, the mobile frame has a circular frame mounted thereon as an integral part thereof. An upper cone member and a lower cone member which are in axial alignment are suspended from and below the circular frame. A conical shaped guard frame is secured to the circular frame above the cone members. A propeller is rotatably secured within the guard frame and is in axial alignment with the cones. A motor, mounted with the guard frame, drives the propeller by means of a pulley and V-belt arrangement. Once the motor is energized, the revolving propeller creates downwardly forced air which passes between the two cone members thereby establishing a wall of downwardly and rapidly moving air which surrounds the area over which the device is positioned and is effective to repel insects attempting to enter the covered area.

An object of this invention is to provide a mobile, forced air insect repelling apparatus for preventing insects and the like from entering a particular area.

Another object is to provide an improved mobile insect repelling apparatus of the forced air type which is supported by a mobile frame which can be disassembled for storage purposes and which may also serve as a mounting for a hammock, swing or the like.

These and other objects and advantages of my invention will more fully appear from the following description made in connection with the accompanying drawings wherein like reference characters refer to the same parts throughout the several views.

DESCRIPTION OF THE DRAWINGS

FIGURE 2 is a fragmentary side elevation view partially in section of the insect repeller mechanism; and FIGURE 3 is an exploded fragmentary pictorial view showing the parts comprising half of the mobile frame, the part not shown being identical in construction.

DESCRIPTION OF THE PREFERRED EMBODIMENTS

Figure 1:
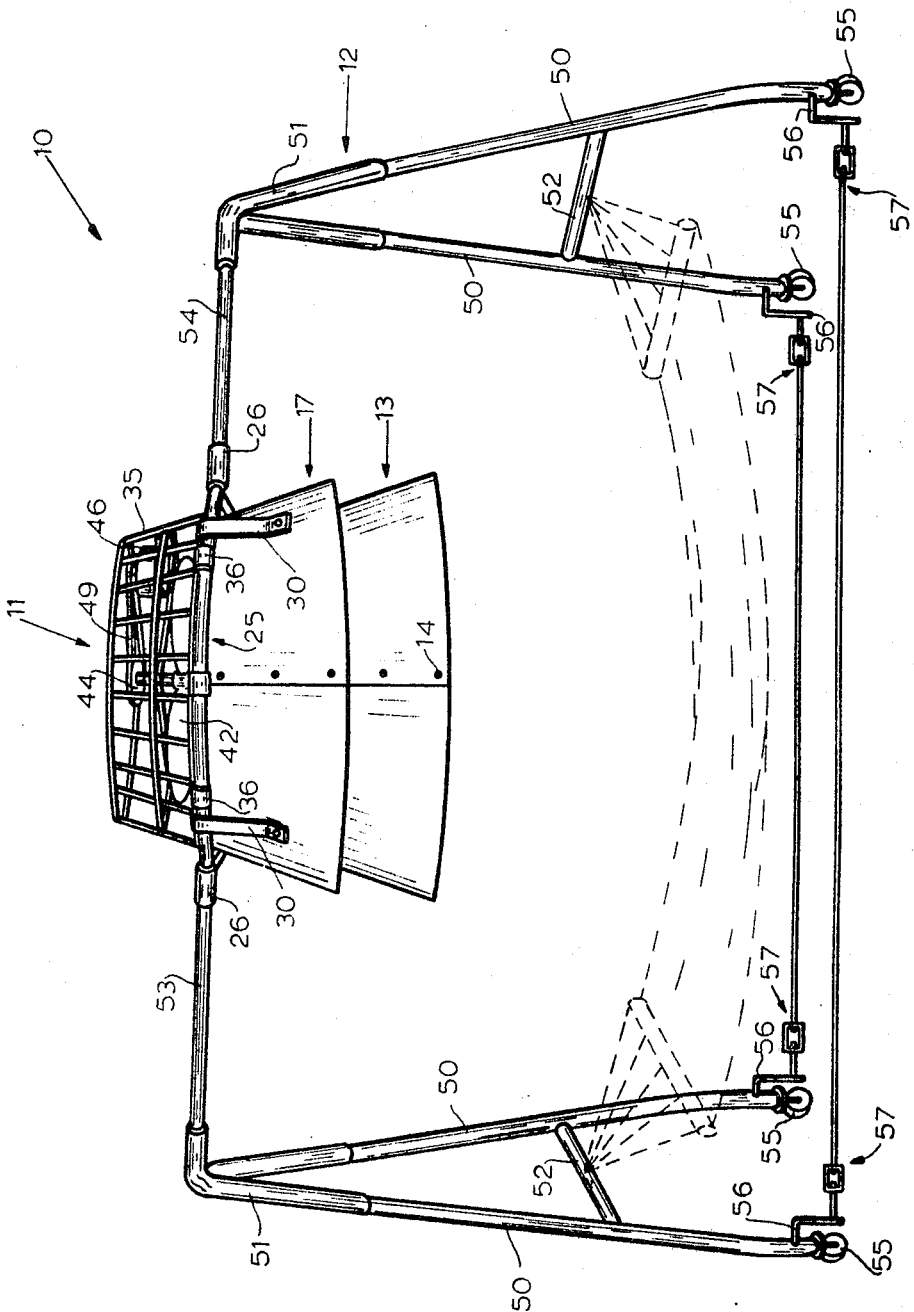
FIGURE 1 is a pictorial view of the insect repeller and frame showing the frame being used as a support for a hammock, the hammock being shown in dashed lines.

In reference to the figures, the invention is generally designated by numeral 10. The invention may be broken down into two main sections: the conical-shaped insect repelling mechanism 11 and the mobile frame 12.

The conical-shaped insect repelling mechanism 11 provides a lower, rigid, conical, thin-walled member herein referred to as lower cone 13. Lower cone 13 is made in two sections 13A and 13B, or as many sections as desired, for disassembly during the transportation of the same from one location to another. Sections 13A and 13B are held together by any suitable means such as screws 14 or a suitable flat lock sheet metal seam (not shown). An outer cone structure, which may be a fabric mounted on a frame, takes the form of an upper cone which is generally represented by numeral 17. Braces 20 extend between and are connected to lower cone 13 and upper cone 17 so as to fixedly define their relation to one another by means of nut and bolt arrangements 21.

A circular support ring 25, being made in halves 25A and 25B, is fixedly secured to mobile frame 12, to be described in detail later, by T-couplings 26. Halves 25A and 25B are held together within T-couplings 26 by bolts 28 extending through them. Suspension brackets 30 are secured to upper cone 17 by bolt and nut arrangements 21.

A guard frame 35, being conical-shaped, is securely fastened to circular support ring 25 by brackets 36. The suspension brackets 30 are then hung over guard frame 35 and circular support ring 25 and thereby suspend upper cone 17 and indirectly lower cone 13 beneath circular support ring 25.

Referring now to the air moving apparatus, a sleeve 40 is vertically supported within guard frame 35 by radial members 41 which are rigidly secured to guard frame 35 by any suitable means. A shaft 32 extends through sleeve 40 and has fastened at its lower end a propeller 42 by means of hub 43. Propeller 42 is suspended in a plane parallel to that of circular support ring 25 and slightly above it. A pulley 44 is secured to the upper end of shaft 32 and prevents the same from moving downwardly in sleeve 40. A motor mount platform 45 is secured, perhaps by welding, to guard frame 35 and receives a variable speed motor 46. Drive shaft 47 of motor 46 is parallel to shaft 32 and mounts a pulley 48 whereby a V-belt 49 or the like connects pulleys 44 and 48 in a working relation. Once a power source energizes motor 46 and causes, through the mechanical arrangement, the propeller to revolve, a downward stream of forced air is created.

Referring now to the mobile frame 12, structure support legs 50 which are braced by members 52 are disposed at a desired angle by angular connections 51. Rods 53 and 54 connect the angular connections 51 with the T-couplings 26. Legs 50, which are provided with ground engaging rollers 55, are rigidly connected to L-shaped members 56 so as to allow turn buckle and rod arrangements 57 to be placed between the legs 50 and parallel to the ground and rods 53 and 54.

In operation, the mobile frame 12 is assembled and the air moving apparatus 11 secured in place by means previously described. Once the motor 46 is energized, the propeller 42 is turned at the desired revolutions per minute. In order to adjust to various wind conditions and insect conditions, motor 46 is selected to have a speed characteristic within the range of speeds desired responsive to the applied voltage. For example, with a cone having a base of 48 inches and a height of 30 inches, a 30 inch propeller rotating at 625 r.p.m. in relatively ambient air was found to produce sufficient air flow to repel flies, gnats and mosquitoes. The applied voltage is controlled by a suitable voltage control which may, for example, be any of the well known solid state feedback type speed controls, or with certain motors, a Variac voltage control may be applied. Thus, as the external air movement increases or decreases or as different kinds of insects are encountered, the speed control can be regulated to maintain effective repelling of the insects. The propeller 42 rotates in a horizontal plane and is in axial alignment with the cones 13 and 17. As propeller 42 turns, air is forced downwardly between the outer surface of the lower cone 13 and the inner surface of the upper cone 17. The upper cone 17 is made from a thin walled rigid material or may be constructed from a fabric which covers a conical, rigid frame. Propeller 42 thus effectively establishes a conical wall of disturbed air or a buffered air zone around the area beneath the cone. In addition to serving as a means for deflecting the air as described, lower cone 13 also serves the useful and practical purpose of shading the area beneath it. Once the apparatus is positioned over the desired area, which includes a hammock or the like, a cool, insect-free area is established beneath the cone thereby offering comfort to the user.

It is understood that the present disclosure has been made only by way of example and that numerous changes in the details of construction and the combination and arrangement of parts may be resorted to without departing from the spirit and scope of the invention hereinafter claimed.

In comparison with my prior patents on insect repelling apparatus, it will be noted from the foregoing description that the present invention has several advantages. A principal advantage is that the present invention can be moved so as to straddle a picnic table, a picnic site on the ground or a work bench but without in any way obstructing the area with support posts, support platforms or the like as with my prior apparatus. Furthermore, the present invention provides the combination of a hammock support and means to keep insects away from the user of the hammock. The present invention thus provides a multi-purpose apparatus cable of providing either an obstruction free, insect free bench area for picnics and the like or an insect free area and support for a hammock. In both cases, the described frame and rod-turnbuckle arrangement insures a rigid and stable support either for the suspended weight of the insect repelling apparatus or of the weight of the hammock and its occupant.

What is claimed is:

1. A mobile shade, insect repelling and hammock support apparatus for a picnic area or the like comprising a mobile frame adapted to be positioned over and be supported by the surface of said area, said mobile frame comprising opposed pairs of diverging support legs extending downwardly and outwardly with the legs of each pair being joined at their vertexes, the distance spanned between said pairs of legs being substantially equivalent to some predetermined length hammock; a pair of horizontal brace members each being connected respectively to and extending between and intermediate the length of a respective pair of legs and being adapted to receive and support one end of a hammock thereon; a horizontal rod member spanning the distance between and joining the vertexes and being supported by said pairs of legs, said rod member having a central portion of its length forming a circular frame disposed substantially parallel to and above said area; upper and lower vertically spaced concentric cone-shaped air deflecting members suspended from and below and concentrically arranged with respect to said circular frame; a conical-shaped guard frame concentric with said circular frame and secured to and supported above said circular frame, said frames and cone members being arranged to leave a substantially unobstructed area between said legs and below said cones adapted to accommodate a picnic table, hammock and the like; a propeller mounted above both said cone members and rotatable about the axis thereof; electric drive means connected to said propeller for driving the same at a relatively high revolving speed whereby air is forced downwardly between the outer surface of said lower deflecting member and the inner surface of said upper deflecting member thereby establishing a wall of downwardly and rapidly moving air surrounding said area being effective to repel insects attempting to enter the same; and a pair of bar members extending between the bottom ends of opposed pairs of said legs, said bar members being effective to prevent said legs from moving outwardly under the influence of the cone, motor and propeller weight supported on said circular frame and from moving inwardly under the influence of the hammock weight supported on said brace members.

2. A mobile shade, insect repelling and hammock apparatus for a picnic area as claimed in claim 1 including a ground engaging wheel mounted on each said lower end of said legs and a turnbuckle connected to each said bar member for adjusting the tension therein and wherein said mobile frame and cone members are assembled in break-down sections.

References Cited

UNITED STATES PATENTS

| | | | |
|---|---|---|---|
| 389,834 | 9/1888 | Caldwell | 230—265 XR |
| 2,977,118 | 3/1961 | Farkas | 272—85 XR |
| 3,145,013 | 9/1964 | Grudoski | 272—85 XR |
| 3,195,845 | 7/1965 | Conti | 248—163 |
| 3,228,317 | 1/1966 | Westman. | |
| 3,258,200 | 5/1966 | White | 230—241 |
| 3,306,532 | 2/1967 | White | 230—241 |

DONLEY J. STOCKING, *Primary Examiner.*

W. J. GOODLIN, *Assistant Examiner.*